United States Patent
Phylip-Jones et al.

(10) Patent No.: US 10,047,608 B2
(45) Date of Patent: Aug. 14, 2018

(54) BALANCING APPARATUS, ARRANGEMENT AND METHOD

(71) Applicant: ROLLS-ROYCE plc, London (GB)

(72) Inventors: James Phylip-Jones, Wirral (GB); Pascal Wilmes, Derby (GB); Mattheus Bakker, Nuneaton (GB); Adegoke Gbadeyan, Derby (GB)

(73) Assignee: ROLLS-ROYCE plc, London (GB)

( * ) Notice: Subject to any disclaimer, the term of this patent is extended or adjusted under 35 U.S.C. 154(b) by 365 days.

(21) Appl. No.: 14/995,913

(22) Filed: Jan. 14, 2016

(65) Prior Publication Data

US 2016/0222785 A1    Aug. 4, 2016

(30) Foreign Application Priority Data

Feb. 4, 2015  (GB) .................................. 1501844.3

(51) Int. Cl.
| | | |
|---|---|---|
| *F01D 5/02* | (2006.01) | |
| *F16F 15/32* | (2006.01) | |
| *G01M 1/36* | (2006.01) | |

(52) U.S. Cl.
CPC .............. *F01D 5/027* (2013.01); *F16F 15/32* (2013.01); *G01M 1/36* (2013.01); *F05D 2300/40* (2013.01); *F05D 2300/431* (2013.01); *F05D 2300/437* (2013.01); *F05D 2300/60* (2013.01); *F05D 2300/603* (2013.01); *F05D 2300/6032* (2013.01)

(58) Field of Classification Search
CPC ........... F01D 5/027; F16F 15/32; G01M 1/36; F05D 2300/40; F05D 2300/431; F05D 2300/437; F05D 2300/60; F05D 2300/603; F05D 2300/6032
See application file for complete search history.

(56) References Cited

U.S. PATENT DOCUMENTS

| | | | |
|---|---|---|---|
| 4,083,735 A | 4/1978 | Caramanian | |
| 5,331,737 A | 7/1994 | Jarvela | |
| 7,597,714 B2* | 10/2009 | Suddaby | ................. A61F 2/441 606/92 |
| 8,122,785 B2* | 2/2012 | Czerniak | ................. F01D 5/027 73/470 |

(Continued)

FOREIGN PATENT DOCUMENTS

| | | |
|---|---|---|
| GB | 410066 A | 5/1934 |
| JP | H02-64432 A | 3/1990 |

OTHER PUBLICATIONS

Jul. 7, 2015 Search Report issued in British Patent Application No. GB1501844.3.

*Primary Examiner* — Logan Kraft
*Assistant Examiner* — Eric Zamora Alvarez
(74) *Attorney, Agent, or Firm* — Oliff PLC

(57) ABSTRACT

The present invention provides an apparatus for providing a balancing weight in a groove on a rotor disk in a gas turbine engine. The apparatus comprises an elongate reservoir for housing a hardenable material and an inflatable balloon in fluid communication with the distal end of the elongate reservoir. An actuator is provided for forcing the hardenable material from the elongate reservoir to inflate the inflatable balloon with hardenable material within the groove on the rotor disk. A sealing device for sealing the inflated inflatable element to form the balancing weight is also provided.

14 Claims, 3 Drawing Sheets

(56) References Cited

U.S. PATENT DOCUMENTS

| | | | |
|---|---|---|---|
| 9,334,737 B2* | 5/2016 | Race | ............... F01D 5/027 |
| 2006/0266114 A1 | 11/2006 | Pichel et al. | |
| 2012/0107095 A1 | 5/2012 | Juh | |

* cited by examiner

BALANCING APPARATUS, ARRANGEMENT AND METHOD

CROSS-REFERENCE TO RELATED APPLICATIONS

This application is based upon and claims the benefit of priority from British Patent Application Number 1501844.3 filed 4 Feb. 2015, the entire contents of which are incorporated by reference.

BACKGROUND

1. Field of the Disclosure

The present disclosure relates to an apparatus, arrangement and method for balancing a rotor disk in a gas turbine engine by adding balancing weights.

2. Description of the Related Art

Rotating components in gas turbine engines must be finely balanced so that the rotational axis of the component defined by the supporting bearings matches the centre of gravity and principal inertia axis of the component. Any mismatch between the two axes will result in an unbalance which may result in vibration and stresses within the gas turbine engine causing wear and damage to the supporting bearings.

A typical high pressure (HP) rotor in an aero-gas turbine engine requires balancing to within about 2 microns and it is necessary to ensure that this level of balancing can be achieved and maintained at all engine operating temperatures and speeds.

The various individual components, e.g. compressor or turbine, making up a rotor are separately balanced before being assembled into the complete rotor. This minimises the amount of balancing required for the complete assembled rotor. Once assembled, the complete rotor can be finely balanced using small correction weights. This fine balancing using correction weights is difficult to achieve for the HP rotor and intermediate pressure (IP) rotor which are relatively inaccessible because they are surrounded by annular casings.

It is known from US 2006/0266114 to provide openings in the annular casings surrounding the HP rotor through which a guide tube can be inserted. A balancing screw is inserted through the guide tube into a threaded hole in an insert housed in a circumferential groove in the outer surface of the rotor disk, the circumferential grove also housing the root portions of the rotor blades. This is repeated at various locations about the circumferential groove to finely balance the rotor.

This known arrangement requires a time-consuming and awkward mating of the threads of the balancing screw and the hole in the insert. It also requires use of a guide tube and specially formed inserts which increase the manufacturing costs.

OBJECTS AND SUMMARY

There is a need for an improved arrangement for inserting balancing weights into the circumferential groove of a rotor disk that is less time-consuming/awkward and which does not require a guide tube or specially designed inserts.

Accordingly, in a first aspect, there is provided an apparatus for providing a balancing weight in a groove on a rotor disk in a gas turbine engine, the apparatus comprising:

an elongate reservoir for housing a hardenable material;
an inflatable element in fluid communication with the distal end of the elongate reservoir;
an actuator for forcing the hardenable material from the elongate reservoir to inflate the inflatable element with hardenable material within the groove on the rotor disk; and
a sealing device for sealing the inflated inflatable element to form the balancing weight.

By providing an elongate reservoir for containing a hardenable material and an actuator for forcing the hardenable material from the reservoir into an inflatable element positioned at the distal end of the reservoir, it is possible to inflate the inflatable element with hardenable material within the groove on the rotor disk. After sealing the inflated inflatable element, the hardenable material-filled inflatable element remains within the groove and, after hardening, can be used as a balancing weight to fine-balance the rotor disk.

Optional features of the invention will now be set out. These are applicable singly or in any combination with any aspect.

In some embodiments, the actuator comprises a plunger positioned at a proximal end of the elongate reservoir, the plunger body forming a tight fit within the elongate reservoir. The proximal end of the reservoir may comprise an enlarged radius portion and the plunger body may form a tight fit with the enlarged radius portion.

The elongate reservoir may comprise a nozzle at its distal end.

In these embodiments, the elongate reservoir and plunger form a syringe.

In some embodiments, the inflatable element is an inflatable balloon.

In some embodiments, the inflatable element/balloon is removable from the balancing weight after hardening of the hardenable material. For example, the inflatable element/balloon may be formed of material that burns off at the operating temperature of the gas turbine engine. For example, the inflatable element/balloon may be formed of Latex® or any other material that is inert when in contact with titanium and burns off at a temperature below 350° C. As the inflatable element/balloon burns off, the solidified hardenable material will remain in the circumferential groove to act as the balancing weight.

In some embodiments, the sealing device biases an open end of the inflatable element towards the distal end of the elongate reservoir e.g. sealing device may be a clamp for clamping an open end of the inflatable element to the distal end of the elongate reservoir. The clamp may be an elastic ring clamp encircling both the open end of the inflatable element and the distal end of the elongate reservoir.

In some embodiments, the elongate reservoir contains a hardenable material.

In some embodiments, the hardenable material may be an air hardenable material i.e. a material that hardens upon exposure to air. In these embodiments, the elongate reservoir is an airtight reservoir.

Suitable air-hardenable materials are Holts Gum™, Unibond repair Metal™, Evo stik liquid Metal™ and ceramic-metallic pastes (e.g. Pyro-Putty® and Permatex® Hi-Temp Metal Repair Compound) but any hardenable materials/putties that are capable of hardening at room temperature may be used.

In some embodiments, the hardenable material may be a two component material, the material being hardenable upon mixing of the two components. In these embodiments, the elongate reservoir comprises two chambers for housing the two components separately.

Suitable two component hardenable materials include epoxy putties.

In a second aspect, there is provided an arrangement for providing a balancing weight in a groove on a rotor disk in a gas turbine engine, the apparatus comprising:
an annular casing surrounding the rotor disk, the annular casing having at least one radially-extending aperture; and
an apparatus according to the first aspect,
wherein the elongate reservoir extends through the at least one radially-extending aperture in the annular casing.

In some embodiments, the arrangement further comprises a rotor disk having a groove, e.g. a circumferential groove for housing a plurality of rotor blades.

In some embodiments, the groove e.g. circumferential groove, has a dovetail axial cross-section with a restricted opening radially outermost. The radially outermost restriction will maintain the inflated inflatable element/balancing weight within the groove.

In some embodiments, the arrangement further comprises a second radially outermost annular casing with a second radially-extending aperture.

In some embodiments, the proximal end of the elongate reservoir extends from the/both annular casing(s).

In a third aspect, there is provided a method of balancing a rotor disk within an annular casing in a gas turbine engine, the method comprising:
providing an apparatus according to the first aspect;
inserting the distal end of the elongate reservoir through a radially-extending aperture in the annular casing;
positioning the inflatable element proximal a groove in the rotor disk;
forcing the hardenable material from the elongate reservoir using the actuator to inflate the inflatable element with hardenable material within the groove on the rotor disk;
sealing the inflated inflatable element using the sealing device;
separating the inflatable element and the elongate reservoir; and
allowing the hardenable material to harden to form a balancing weight.

In some embodiments, when the actuator is a plunger, the method comprises depressing the plunger to force the hardenable material from the elongate reservoir (e.g. through the nozzle) into the inflatable element.

In some embodiments, where the groove on the rotor disk is a circumferential groove, the method comprises inflating the inflatable element within the circumferential groove e.g. between two rotor blades.

In some embodiments, separating the inflatable element and the elongate reservoir comprises retracting the distal end of the elongate reservoir from an open end of the inflatable element to allow the sealing device to seal the open end of the inflatable element. Where the sealing device is an elastic clamp, retracting the distal end of the elongate reservoir allows the elastic clamp to constrict and seal the open end of the inflatable element.

In some embodiments, the method comprises retracting the elongate reservoir from the radially-extending aperture in the annular casing.

In some embodiments, the method comprises heating the hardenable material within the inflatable element in order to accelerate hardening.

In some embodiments, the method comprises removing (e.g. by burning off) the inflatable element from the balancing weight.

BRIEF DESCRIPTION OF THE DRAWINGS

Embodiments will now be described by way of example with reference to the accompanying drawings in which.

DETAILED DESCRIPTION OF EMBODIMENTS

Figure 1:
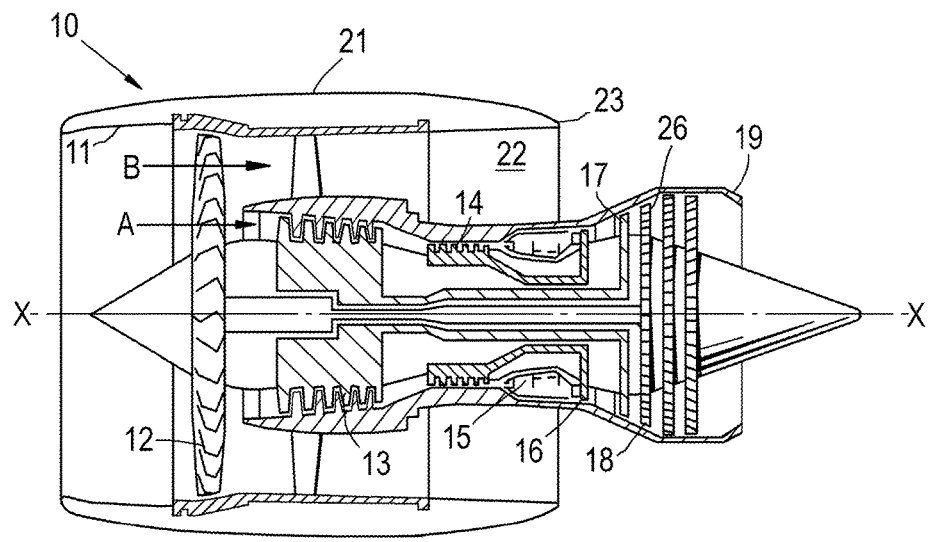
FIG. 1 shows a ducted fan gas turbine engine incorporating the invention.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Any axial unbalance in the various rotating components e.g. in the compressors/turbines e.g. any discrepancy between the centre of gravity/principal axis of inertia and the axis defined by the mounting bearings, will lead to undesirable vibrations and stresses within the gas turbine engine. Each rotating component is independently balanced prior to assembly but fine tuning by adding balancing weights post assembly is often necessary.

FIGS. 2 and 3A to 3C show a first embodiment of an apparatus/arrangement according to a first embodiment of the present disclosure for adding a balancing weight. Such a balancing weight may, for example, be provided to a compressor, such as the high pressure (HP) compressor 14, after assembly of the gas turbine engine 10.

Figure 2:
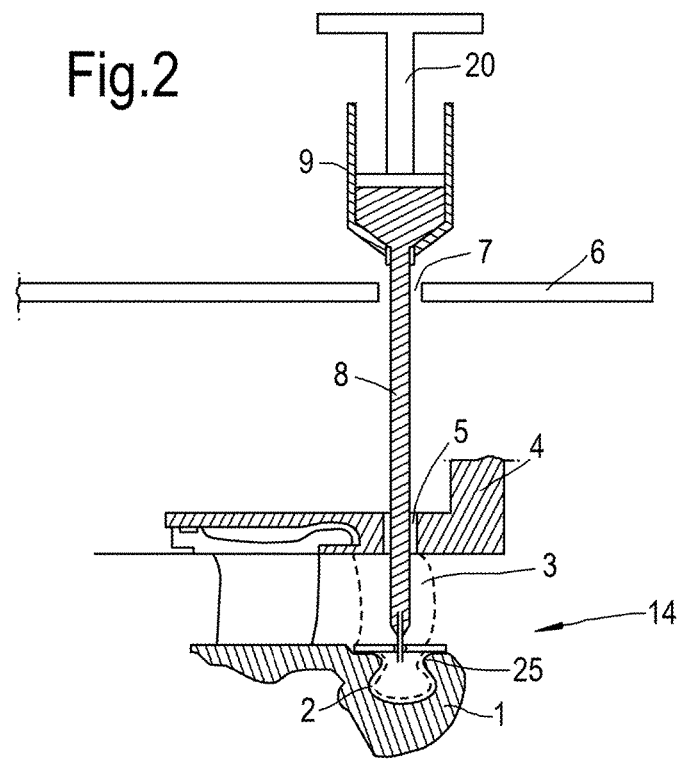
FIG. 2 shows an axial cross section through a HP compressor showing an apparatus according to a first embodiment.

FIG. 2 is an axial cross section through the compressor 14, which may be referred to as the HP compressor 14. The HP compressor comprises a rotor disk 1 having a circumferential groove 2 housing a plurality of circumferentially-spaced rotor blades 3. The circumferential groove 2 has a dove-tail axial cross-section with a restricted opening 25 located radially outermost.

The HP compressor 14 is surrounded by a first annular casing 4 which has a first radially-extending aperture 5. A second annular casing 6 is provided radially outermost and this comprises a second radially-extending aperture 7 which is radially aligned with the first radially-extending aperture 5.

The apparatus comprises an elongate reservoir 8 containing a hardenable material. The hardenable material may be a metal putty in the illustrated example. At its proximal end, the elongate reservoir 8 comprises an enlarged radius portion 9 housing an actuator in the form of a plunger 20 which has a plunger body forming a tight fit within the enlarged radius portion 9. The distal end of the elongate reservoir is provided with a nozzle 24.

The elongate reservoir 8 extends through the second radially-extending aperture 7 and the first radially-extending aperture 5 with the nozzle 24 positioned proximal the restricted opening 25 of the circumferential groove 2. The enlarged radius portion 9 at the proximal end of the elongate reservoir 8 is positioned radially outwards of the second annular casing 6.

Figure 3A:
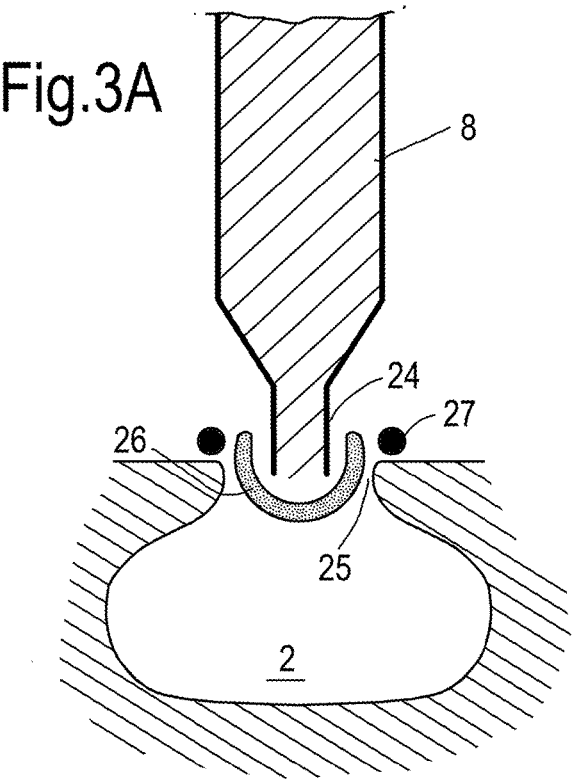
FIGS. 3A-C show steps in a method of using the apparatus shown in FIG. 2.

As can be seen in FIG. 3A, the nozzle 24 at the distal end of the elongate reservoir 8 is in fluid communication with an inflatable element 26 e.g. an inflatable Latex balloon. A sealing device in the form of an clamping ring 27 (which may be, for example, an elastic clamping ring) biases the open end of the inflatable element 26 against the nozzle 24 of the elongate reservoir 8.

Figure 3B:
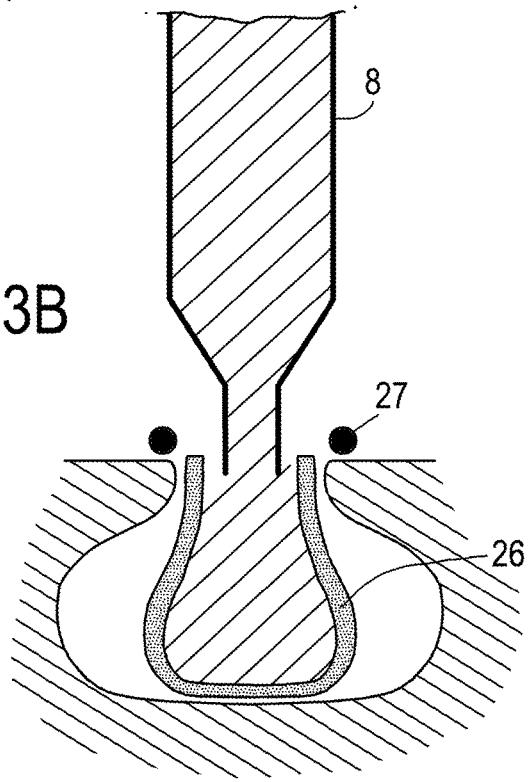

Once the nozzle 24 is appropriately positioned at a location requiring extra weight for balancing, the plunger 20 is depressed into the enlarged radius portion 9 of the elongate reservoir 8 and this causes metal putty to flow from the elongate reservoir 8 to inflate the inflatable element 26 as shown in FIG. 3B.

After a sufficient amount of metal putty has been added to the inflatable element 26, the elongate reservoir 8 is retracted away from the inflatable element 26. The retraction of the nozzle 24 from within the clamping ring 27 allows the clamping ring to constrict the open end of the inflatable element 26 to seal it. The elongate reservoir 8 is then fully retracted from within the annular casings 4, 6.

Figure 3C:
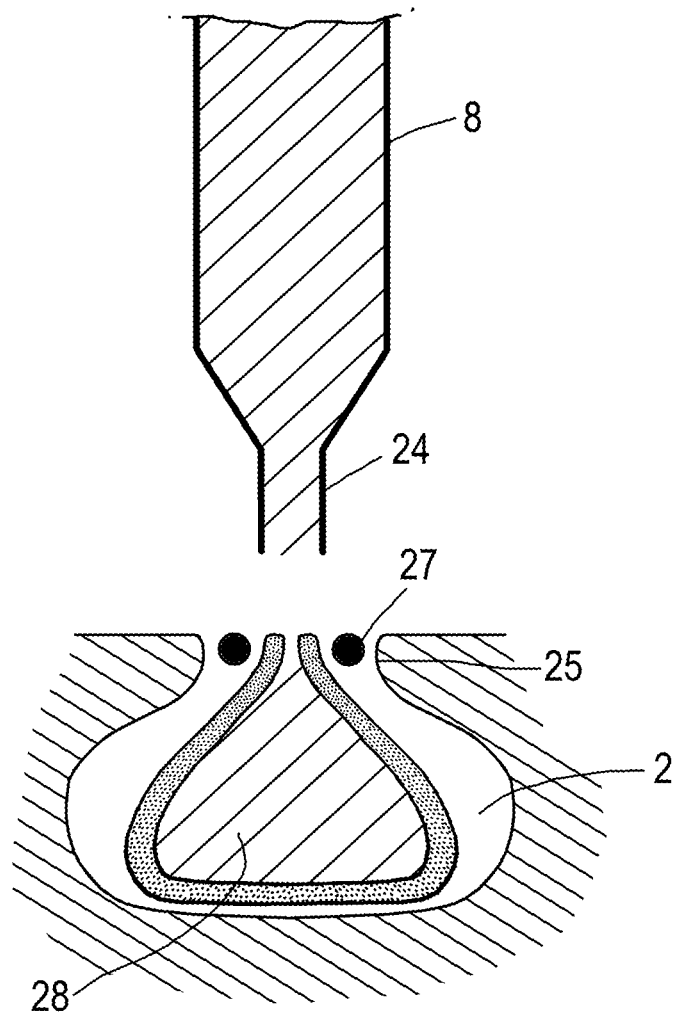

The metal putty-filled inflatable element 26 is retained within the circumferential groove 2 by the restricted opening 25. The metal putty (or other hardenable material) hardens at room temperature to from a balancing weight 28 within the circumferential groove 2 as shown in FIG. 3C.

The inflatable element 26 is subsequently removed from the balancing weight 28 by burning off at the operating temperature of the gas turbine engine 10. The balancing weight retained in the circumferential groove 2 then comprises a ball of solidified metal.

This process can be repeated at other locations round the circumferential groove 2 to effect the required balancing of the HP compressor 14.

While the disclosure has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

We claim:

1. An arrangement for providing a balancing weight in a groove on a rotor disk in a gas turbine engine, the arrangement comprising:

an annular casing surrounding the rotor disk, the annular casing having at least one radially-extending aperture; and an apparatus for providing a balancing weight in a groove on a rotor disk in a gas turbine engine, the apparatus comprising:

an elongate reservoir for housing a hardenable material;

an inflatable balloon in fluid communication with a distal end of the elongate reservoir;

an actuator for forcing the hardenable material from the elongate reservoir to inflate the inflatable balloon with hardenable material within the groove on the rotor disk; and a sealing device for sealing the inflated balloon to form the balancing weight, wherein the elongate reservoir extends through the at least one radially-extending aperture in the annular casing.

2. The arrangement according to claim 1, wherein the actuator comprises a plunger positioned at a proximal end of the elongate reservoir, the plunger forming a tight fit within the elongate reservoir.

3. The arrangement according to claim 1, wherein the inflatable balloon is an inflatable latex balloon.

4. The arrangement according to claim 1, wherein the inflatable balloon is removable from the balancing weight.

5. The arrangement according to claim 1, wherein the sealing device biases an open end of the inflatable balloon towards the distal end of the elongate reservoir.

6. The arrangement according to claim 1, wherein the elongate reservoir contains a hardenable material.

7. The arrangement according to claim 1, further comprising a rotor disk having a circumferential groove for housing a plurality of rotor blades.

8. The arrangement according to claim 7, wherein the circumferential groove has a dovetail axial cross-section with a restricted opening radially outermost.

9. A method of balancing a rotor disk within an annular casing in a gas turbine engine, the method comprising:

providing an apparatus for providing a balancing weight in a groove on a rotor disk in a gas turbine engine, the apparatus comprising:

an elongate reservoir for housing a hardenable material;

an inflatable balloon in fluid communication with a distal end of the elongate reservoir;

an actuator for forcing the hardenable material from the elongate reservoir to inflate the inflatable balloon with hardenable material within the groove on the rotor disk; and a sealing device for sealing the inflated balloon to form the balancing weight;

inserting the distal end of the elongate reservoir through a radially-extending aperture in the annular casing;

positioning the inflatable balloon proximal a groove in the rotor disk;

forcing hardenable material from the elongate reservoir using the actuator to inflate the inflatable balloon with hardenable material within the groove on the rotor disk;

sealing the inflated inflatable balloon using the sealing device;

separating the inflatable balloon and the elongate reservoir; and allowing the hardenable material to harden to form a balancing weight.

10. The method according to claim 9, wherein the actuator is a plunger and the method comprises depressing the plunger to force the hardenable material from the elongate reservoir into the inflatable balloon.

11. The method according to claim 9, further comprising removing the inflatable balloon from the balancing weight.

12. The method according to claim 11, comprising burning off the inflatable balloon from the balancing weight.

13. The method according to claim 9, comprising retracting the distal end of the elongate reservoir from an open end of the inflatable balloon to allow the sealing device seal the open end of the inflatable balloon.

14. The method according to claim 13, comprising retracting the elongate reservoir from the radially-extending aperture in the annular casing.

* * * * *